(12) United States Patent
Sposato

(10) Patent No.: US 8,714,126 B2
(45) Date of Patent: May 6, 2014

(54) SOLAR PANEL MOTOR OIL HEATING SYSTEM, PRODUCT AND METHOD

(76) Inventor: Richard D. Sposato, Pleasant Hill, CA (US)

( * ) Notice: Subject to any disclaimer, the term of this patent is extended or adjusted under 35 U.S.C. 154(b) by 404 days.

(21) Appl. No.: 12/524,482

(22) PCT Filed: Jan. 25, 2008

(86) PCT No.: PCT/US2008/052037
§ 371 (c)(1),
(2), (4) Date: Oct. 19, 2009

(87) PCT Pub. No.: WO2009/005849
PCT Pub. Date: Jan. 8, 2009

(65) Prior Publication Data
US 2010/0212317 A1    Aug. 26, 2010

(51) Int. Cl.
*F02B 63/00* (2006.01)

(52) U.S. Cl.
USPC ........... 123/142.5 E; 123/2; 123/3; 60/641.8; 184/104.1

(58) Field of Classification Search
USPC ............. 123/142.5 E; 219/205; 184/104.1, 184/104.2; 60/641.8
See application file for complete search history.

(56) References Cited

U.S. PATENT DOCUMENTS

| | | | |
|---|---|---|---|
| 2,698,374 A | 12/1954 | Carpenter | |
| 3,798,027 A | 3/1974 | Defranco | |
| 3,798,072 A * | 3/1974 | Anderson | 123/142.5 E |
| 3,870,855 A | 3/1975 | Edlund et al. | |
| 3,960,322 A * | 6/1976 | Ruff et al. | 62/228.1 |
| 3,970,816 A * | 7/1976 | Hosokawa et al. | 219/205 |
| 4,765,144 A * | 8/1988 | Spacer | 60/692 |
| 5,017,758 A | 5/1991 | Kirkman | |
| 5,280,158 A * | 1/1994 | Matava et al. | 219/492 |
| 5,352,862 A * | 10/1994 | Barr | 219/205 |
| 6,633,824 B2 | 10/2003 | Dollar | |
| 6,700,054 B2 * | 3/2004 | Cherney et al. | 136/246 |
| 6,951,099 B2 | 10/2005 | Dickau | |
| 2006/0055175 A1 * | 3/2006 | Grinblat | 290/54 |
| 2007/0062496 A1 * | 3/2007 | Snower et al. | 123/549 |
| 2008/0062496 A1 * | 3/2008 | Miller | 359/223 |
| 2008/0178830 A1 * | 7/2008 | Sposato | 123/142.5 E |

FOREIGN PATENT DOCUMENTS

DE    019645278 A1    5/1997
DE    19645278 A1 *   5/1997

* cited by examiner

*Primary Examiner* — Noah Kamen
*Assistant Examiner* — Long T Tran
(74) *Attorney, Agent, or Firm* — West & Associates, APC; Stuart J. West; Shaun N. Swhan

(57) ABSTRACT

A motor oil heating system for a vehicle comprising one or more solar panels comprised of one or more photovoltaic cells; one or more heaters thermally coupled to the motor oil, wherein the solar panels are electrically coupled to the heaters and power the heaters based on a voltage generated by the solar panel such that the heaters warm the engine oil.

6 Claims, 9 Drawing Sheets

SOLAR PANEL MOTOR OIL HEATING SYSTEM, PRODUCT AND METHOD

TECHNICAL FIELD

Solar panel heating systems

BACKGROUND ART

Vehicle heating systems

DISCLOSURE OF INVENTION

Technical Problem

The basic performance of an engine or other machinery is based on the viscosity of the lubricant. Viscosity is the resistance to the flowability of the oil. The thicker an oil, the higher its viscosity. Multigrade motor oils work by having a polymer added to a light base oil which prevents the oil from thinning too much as it warms up. At low temperatures, the polymers are coiled up and allow the oil to flow. As the oil heats up, the polymers unwind into long chains which prevent the oil from thinning as much as it normally would.

The viscosity index (VI) of a lubricant is an empirical formula that allows the change in viscosity caused by heating to be calculated. The higher the viscosity index, the less an oil will thin at a specified temperature. Multi-viscosity motor oils will have a viscosity index well over 100, while single viscosity motor oils and most industrial oils will have a VI of about 100 or less.

The viscosity of an engine's oil and the performance of an automobile are related. If the viscosity is too high for the ambient temperature, the oil pump will have to work too hard to deliver the oil and result will be a lower fuel efficiency as measured in miles per gallon (MPG). Conversely, if the oil viscosity is too low then the engine will have an excessive amount of internal friction also resulting in a lower MPG.

Technical Solution

As such what is needed is a system and method for ensuring motor oil is at an appropriate temperature for efficient engine operation.

Advantageous Effects

Figure 1:
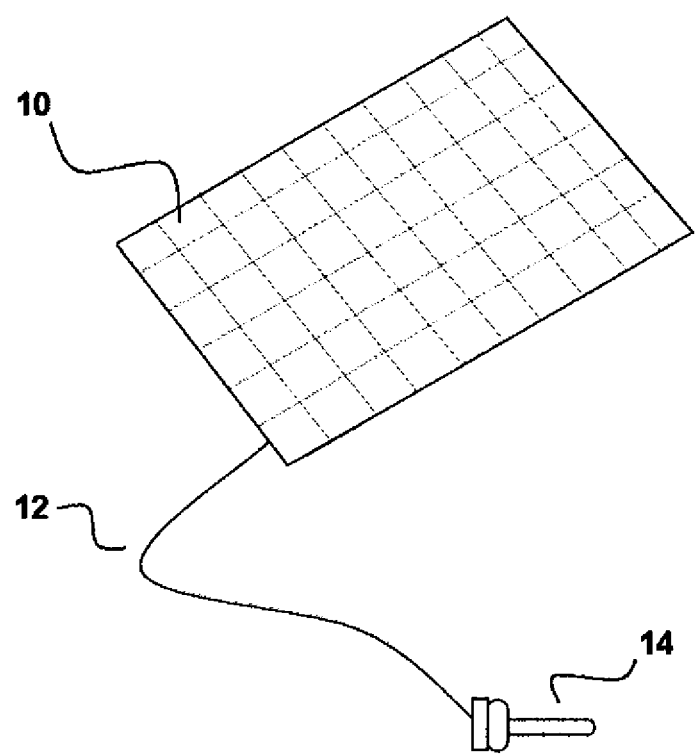
FIG. 1 illustrates a first embodiment of a motor oil heating system and method.

This invention provides increased fuel efficiency by heating the engine oil from a 'cold start' temperature, which is determined by environmental settings, to a temperature where the oil viscosity is reduced such that pumping the oil through the engine is facilitated. The cold start temperature is may be determined by the ambient temperature or the other factors wherein the oil temperature is below its optimum viscosity. One having skill in the art will appreciate that the further from the optimum operating temperature the oil is, the more fuel efficiency can be increased with the current invention. Also one having skill in the arts will appreciate that the current invention may be used for motor oil, for transmission oil or other fluids where increasing their temperature increases overall engine efficiency.

The benefit of the current invention is that the engine oil is warmed using energy from renewable sources. Since it is easier for an engine to pump a warm oil than a cold oil, the engine will have less of a load and consequently consume less power. In effect this invention provides increased fuel economy by reducing gasoline consumption for the same engine performance.

DESCRIPTION OF DRAWINGS

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a first embodiment of the present invention. A solar panel 10 comprised of one or more photovoltaic cells is connected to a heating element 14 using electrical wiring 12 such that the solar panel collects energy from light, converts it into electricity and supplies the electricity to a heating element 14. The heating element 14 is thermally coupled to the motor oil reservoir of an engine such that the motor oil is kept warm when there is sufficient light impacting the photovoltaic cells. This is accomplished by placing the heating element 14 on or near an oil pan of a vehicle, such that when the vehicle is not operating, the oil temperature is maintained above ambient temperature when there is sufficient light to power the heating element 14.

A single solar cell normally produces voltage and current much less than the typical requirement of a heating element. A photovoltaic cell typically provides 0.2-1.4 V and 0.1-5 A, depending on the photovoltaic cell and its operating conditions, e.g. direct sun light, cloudy, etc., while the electrical load most likely requires a greater operating voltage and current. Thus a number of photovoltaic cells are arranged in series to provide the needed voltage requirement, and arranged in parallel to provide the needed current requirement.

One having skill in the art will recognize that there are many ways to effect the collection of solar power and conversion into electricity. For vehicles, a thin film flexible solar panel may be used to conform to existing vehicle designs so that environmental and operating conditions are not adversely affected.

There are many types of heating elements known in the art. A heating element converts electricity into heat through the process of Joule heating. Electrical current running through the element encounters resistance, resulting in heating of the element. One having skill in the art would recognize that thermally coupling the heating element to the vehicle oil requires selection of an appropriate means so that the oil, which may be flammable, it not overheated. The heating element 14 may be thermally coupled by attaching it to the exterior of the oil pan using a variety of means.

This invention provides increased fuel efficiency by heating the engine oil from a 'cold start' temperature, which is determined by environmental settings, to a temperature where the oil viscosity is reduced such that pumping the oil through the engine is facilitated. The cold start temperature is may be determined by the ambient temperature or the other factors wherein the oil temperature is below its optimum viscosity. One having skill in the art will appreciate that the further from the optimum operating temperature the oil is, the more fuel efficiency can be increased with the current invention. Also one having skill in the arts will appreciate that the current invention may be used for motor oil, for transmission oil or other fluids where increasing their temperature increases overall engine efficiency.

The benefit to the current invention is that the engine oil is warmed using energy from renewable sources. Since it is easier for an engine to pump a warm oil than a cold oil, the engine will have less of a load and consequently consume less power. In effect this invention provides increased fuel economy by reducing gasoline consumption for the same engine performance.

References in the specification to 'one embodiment', 'an embodiment', 'an example embodiment', etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to affect such feature, structure or characteristic in connection with other embodiments whether or not explicitly described. Parts of the description are presented using terminology commonly employed by those of ordinary skill in the art to convey the substance of their work to others of ordinary skill in the art.

Figure 2:
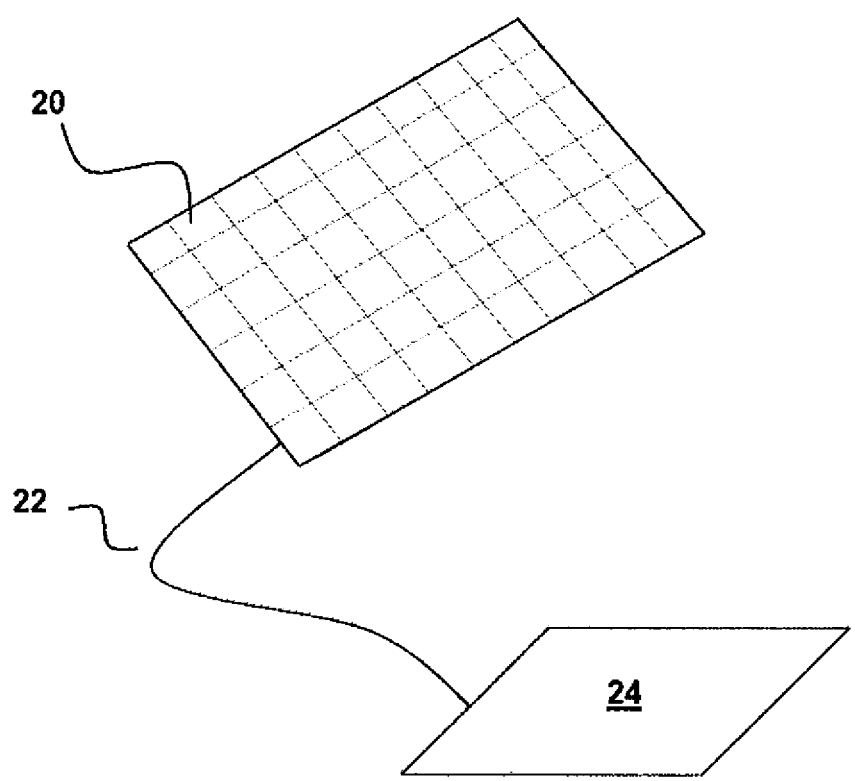
FIG. 2 shows another embodiment of a motor oil heating system and method.

FIG. 2 shows another embodiment of the current invention using a heating pad 24 instead of a heating element discussed above. A solar panel 20 comprised of one or more photovoltaic cells is connected to a heating pad 24 using electrical wiring 22 such that the solar panel collects energy from light, converts it into electricity and supplies the electricity to a heating pad 24. The heating pad 24 is thermally coupled to the motor oil reservoir of the engine such that the motor oil is kept warm when there is sufficient light impacting the photovoltaic cells. This is accomplished by placing the heating pad 24 on or near an oil pan of a vehicle, such that when the vehicle is not operating, the oil temperature is maintained above ambient temperature when there is sufficient light to power the heating pad 24.

Figure 3:
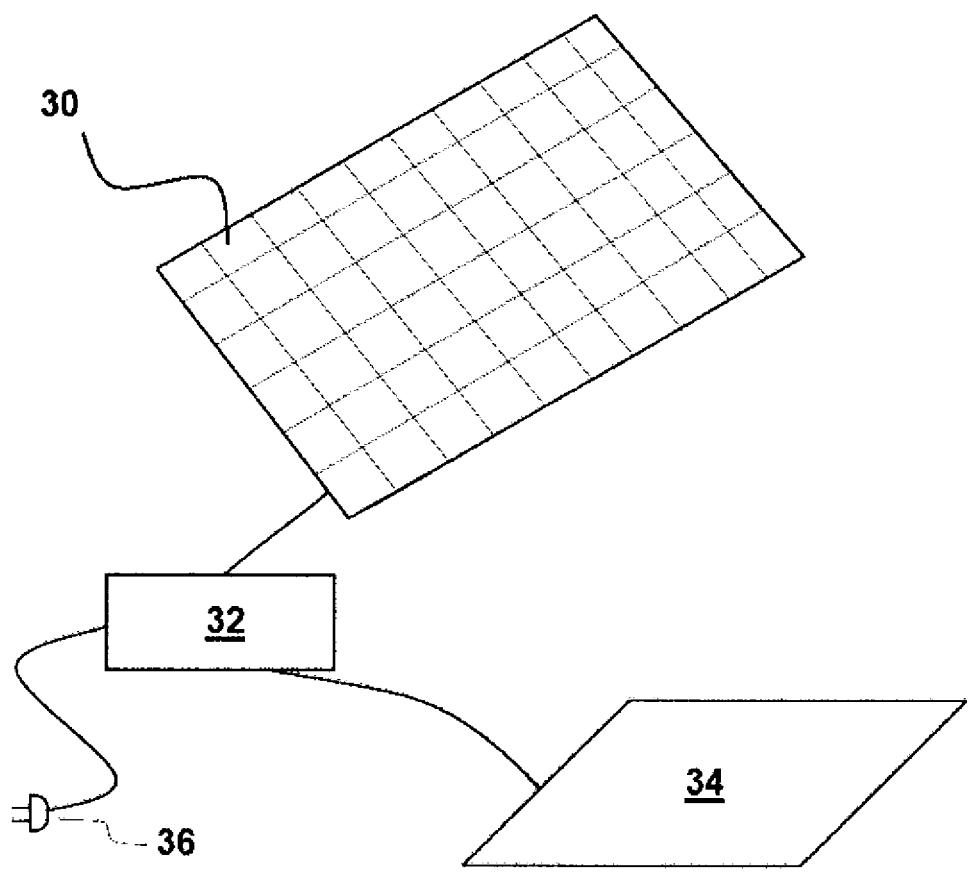
FIG. 3 shows another embodiment of a motor oil heating system and method.

FIG. 3 shows another embodiment of the current invention with a control module. A solar panel 30 comprised of one or more photovoltaic cells is coupled to a heating pad 34 through a control module 32. An electrical plug 36 is connected to the control module 32 for supplying the control module with electrical power. In normal operation the solar panel collects energy from light, converts it into electricity and supplies the electricity to a heating pad 34. The heating pad 34 is thermally coupled to the motor oil reservoir of the engine such that the motor oil is kept warm when there is sufficient light impacting the photovoltaic cells. This is accomplished by placing the heating pad 34 on or near an oil pan of a vehicle, such that when the vehicle is not operating, the oil temperature is maintained above ambient temperature when there is sufficient light to power the heating pad 34.

When there is insufficient light for powering the heating pad 34, the control module 32 is used to provide an alternative means for powering the heating pad 34. At its most basic level the control module 32 may contain a switch. When there is insufficient light a user can switch the power to the heating pad 34 such that it is powered by the electrical power supply instead of the solar panel 30. On another level the control module 32 may also contain a voltage regulator circuit that detects when the voltage from the solar panel 30 is insufficient and automatically switches between an electrical power supply and the solar panel 30 depending on the output of the solar panel 30.

One having skill in the art would appreciate that the heating pad 34 of the current embodiment may be replaced by other heaters including the earlier described heating element.

Figure 4:
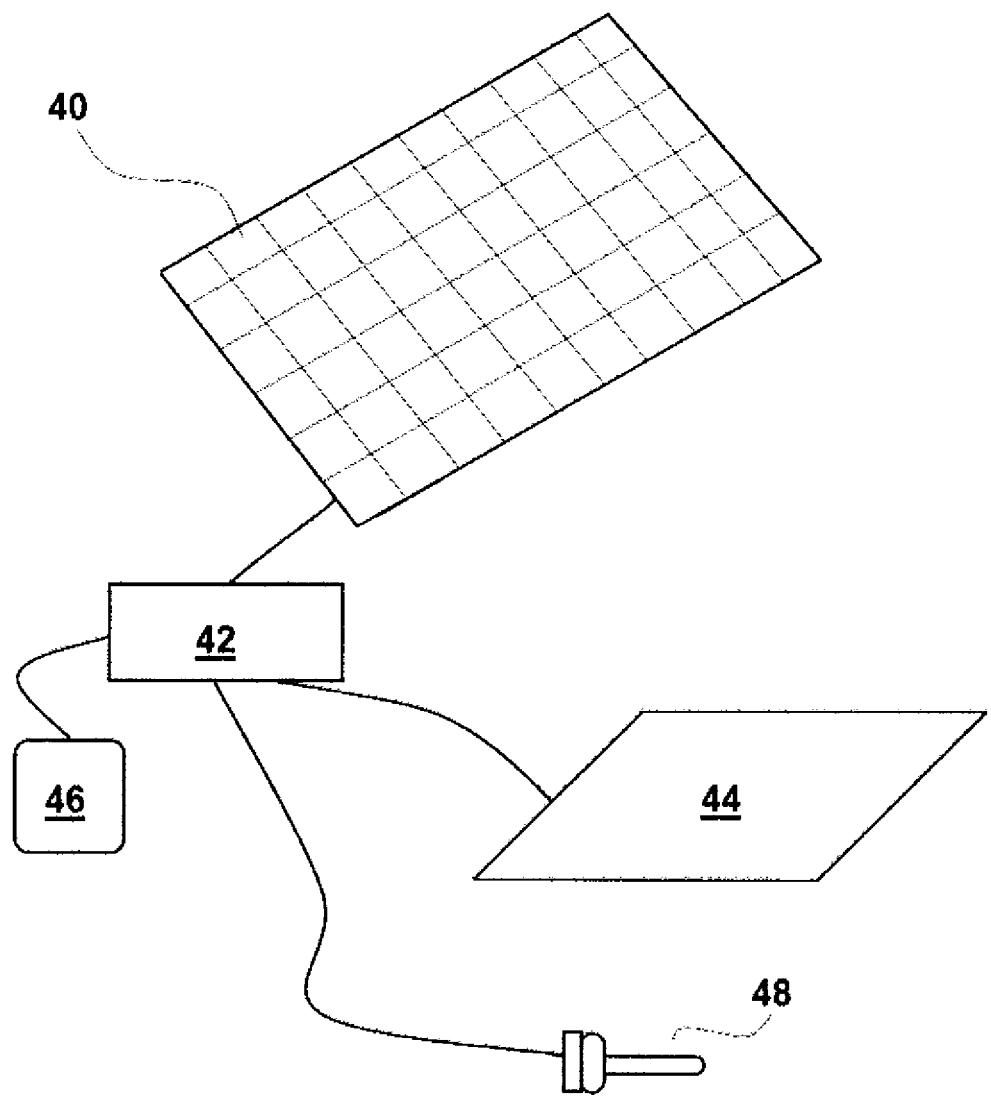
FIG. 4 shows another embodiment of a motor oil heating system and method.

FIG. 4 shows another embodiment of the current invention with a battery connected to the control module. A solar panel 40 comprised of one or more photovoltaic cells coupled to one or more heaters such as a heating pad 44, or a heating element 48 or a combination thereof through a control module 42. A battery 46 is connected to the control module 42 for supplying the control module 42 with electrical power. In normal operation the solar panel collects energy from light, converts it into electricity and supplies the electricity to a heating pad 44 or heating element 48. The heating pad 44 or heating element 48 is thermally coupled to the motor oil reservoir of the engine such that the motor oil is kept warm when there is sufficient light impacting the photovoltaic cells. This is accomplished by placing the heating pad 44 or heating element 48 on or near an oil pan of a vehicle, such that when the vehicle is not operating, the oil temperature is maintained above ambient temperature when there is sufficient light to power the heating pad 44 or heating element 48.

When there is insufficient light for powering the heating pad 44 or the heating element 48, the control module 42 is used to provide an alternative means of power from the battery 46. At its most basic level the control module 32 may contain a switch. When there is insufficient light a user can switch the power from the solar panel 40 to the battery 46. The control module 42 may also contain a voltage regulator circuit that detects when the voltage from the solar panel 40 is insufficient and automatically switches between a battery 46 and the solar panel 40 depending on the output of the solar panel 40.

In the current embodiment the control module also provides circuitry to direct surplus power from the solar panel 40 to the battery 46 thus charging the battery during times of increased sunlight and storing power for later use in times of reduced sunlight.

Figure 5:
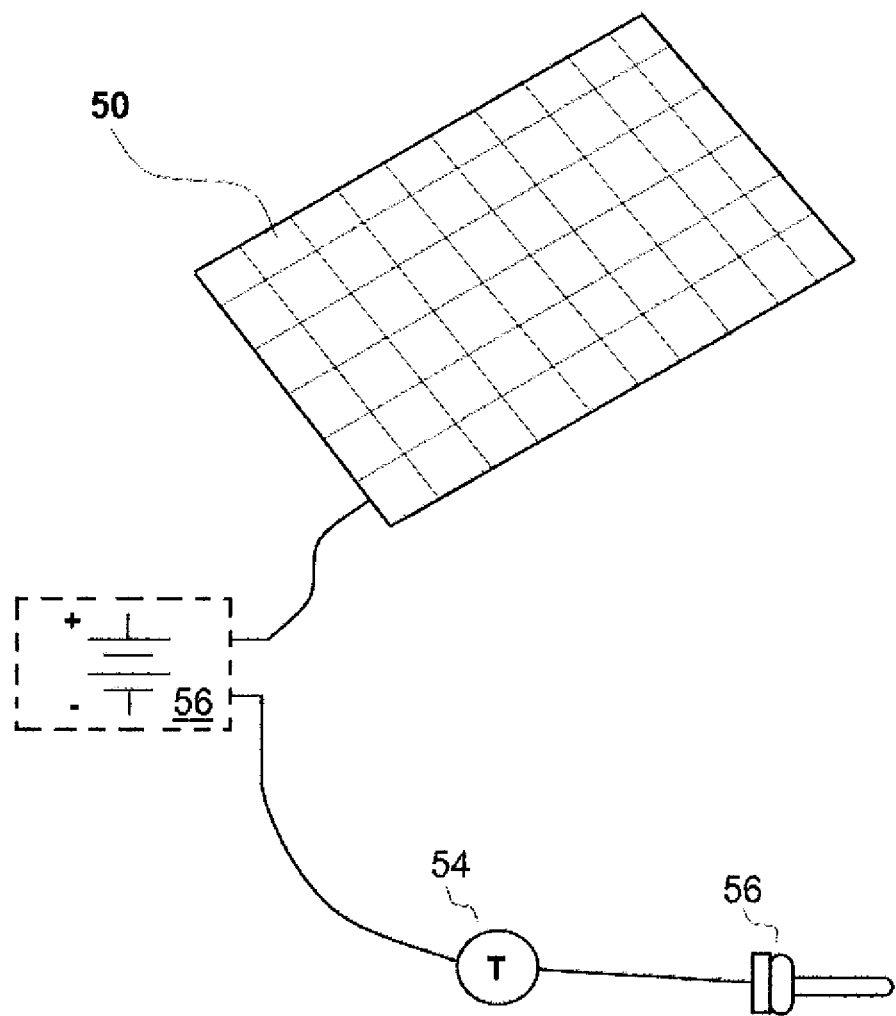
FIG. 5 shows another embodiment a motor oil heating system and method.

FIG. 5 shows another embodiment of the current invention using a timer 54 and a battery 52. The timer 54 is connected to the battery 52 which in turn is connected to a solar panel 50. The timer 54 controls a heater 56. In this embodiment the solar panel 50 will charge the battery 52 until the battery 52 has sufficient power to operate the heater 56 effectively. The battery 52 is used to store power when the solar panel does not provide enough power to operate the heater. In this embodiment the heater is on for 2 hours and off for 10 hours. FIG. 5 shows another embodiment of the current invention using a timer 54 and a battery 52. The timer 54 is connected to the battery 52 which in turn is connected to a solar panel 50. The timer 54 controls a heater 56. In this embodiment the solar panel 50 will charge the battery 52 until the battery 52 has sufficient power to operate the heater 56 effectively. The battery 52 is used to store power when the solar panel does not provide enough power to operate the heater. In this embodiment the heater is on for 2 hours and off for 10 hours.

Figure 6:
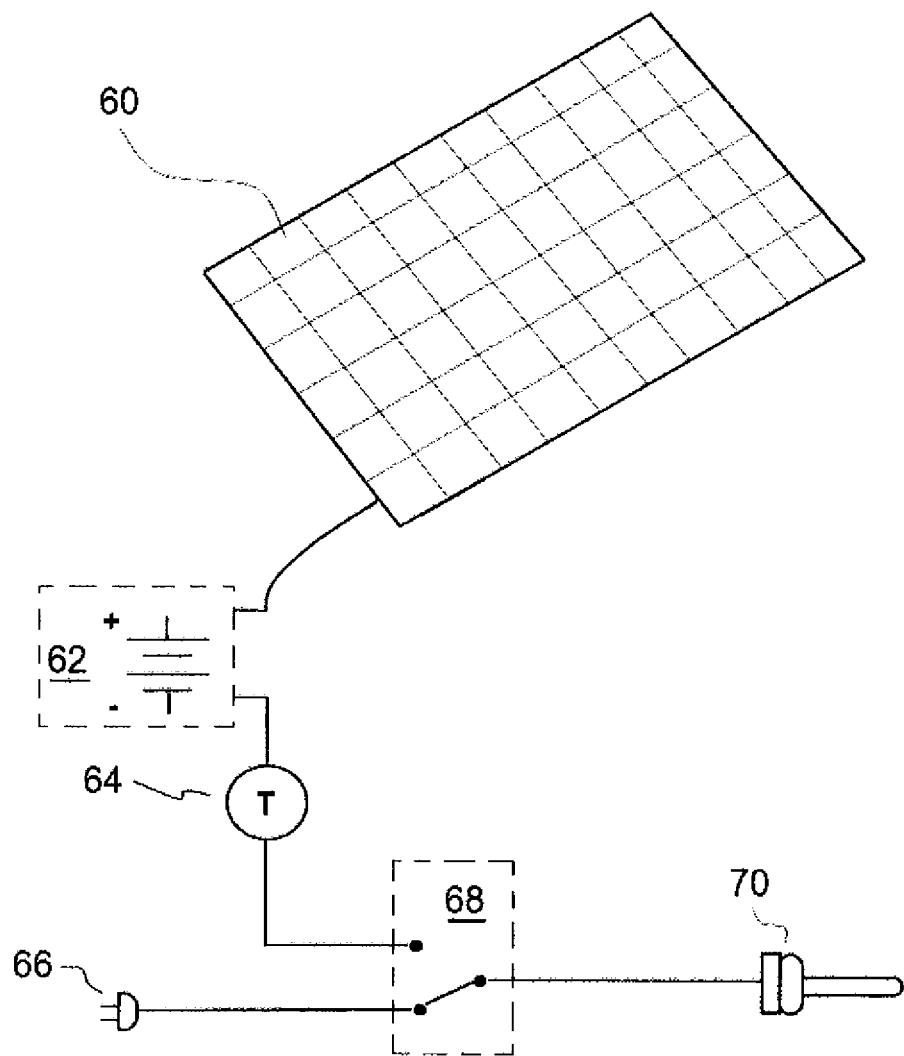
FIG. 6 shows another embodiment of a motor oil heating system and method.

FIG. 6 shows another embodiment of the current invention using a timer 64, a battery 62, an AC electrical outlet and plug 66 and a switch 68. Here when the switch is set to connect electricity from the electrical plug and AC outlet 66 to a heater 70, power is supplied to the heater 70 from a conventional source such as a home electrical power plug and AC outlet. When the switch is set to connect the heater to the timer 64, power is supplied to the heater 70 from the battery 62. The timer 64 directs power to heater 70 and provides for charging the battery 62. The switch 68 can be activated in a plurality of methods including sensors, programmable controls and manual.

Figure 7:
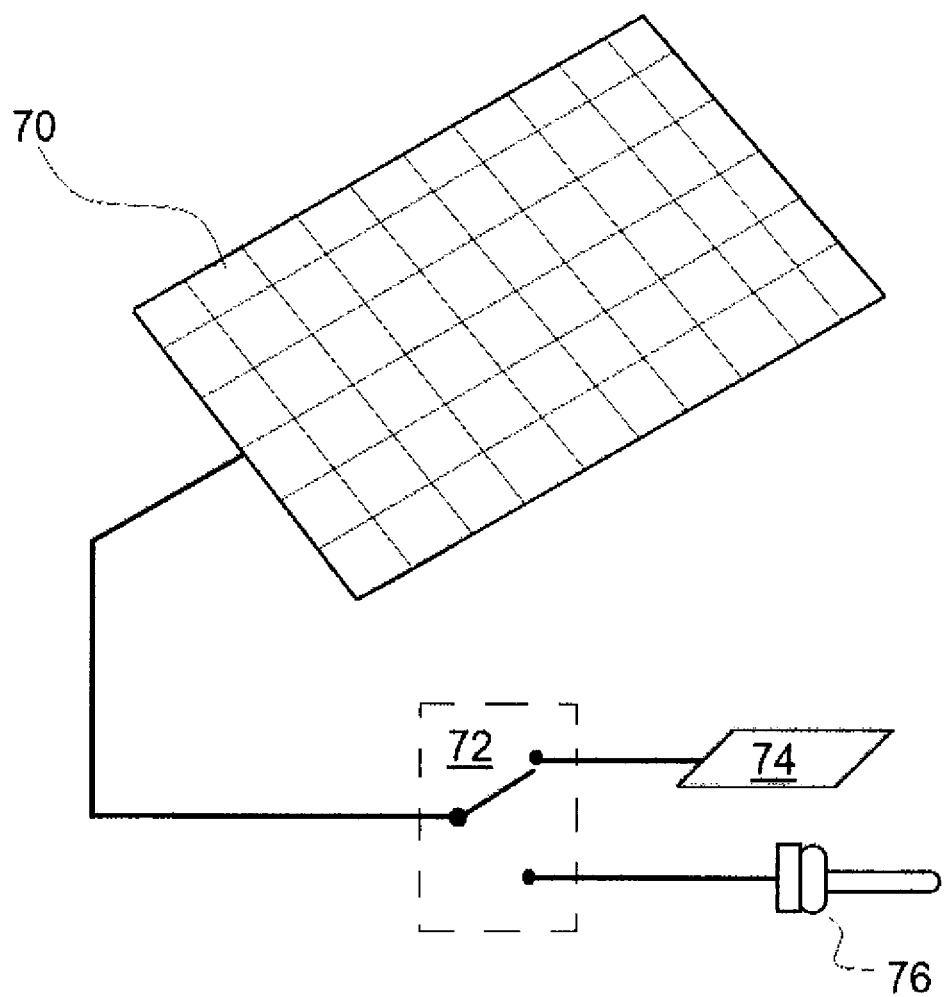
FIG. 7 illustrates one embodiment of a motor oil heating system and method.

FIG. 7 illustrates one embodiment of the current invention with one or more heating elements and a switch. Here the solar panel 78 provides power to a switch 72 which can be switched to a first heating element 74 (shown as a heating pad) or to a second heating element 76. Additional heating elements can be added to the application as required to heat a plurality of oil reservoirs, as feasible with the designed battery circuit and voltage. By having two or more heating elements the invention can be used to heat a plurality of oil reservoirs on a vehicle, for example, both the motor oil and the transmission oil. Also a heating pad can be used to externally heat the oil pan, while another heating element is used to heat transmission oil by an insert mechanism either threaded or snapped into a prepared opening. The switch 72 is used to select one or more of the heating elements to operate.

Figure 8:
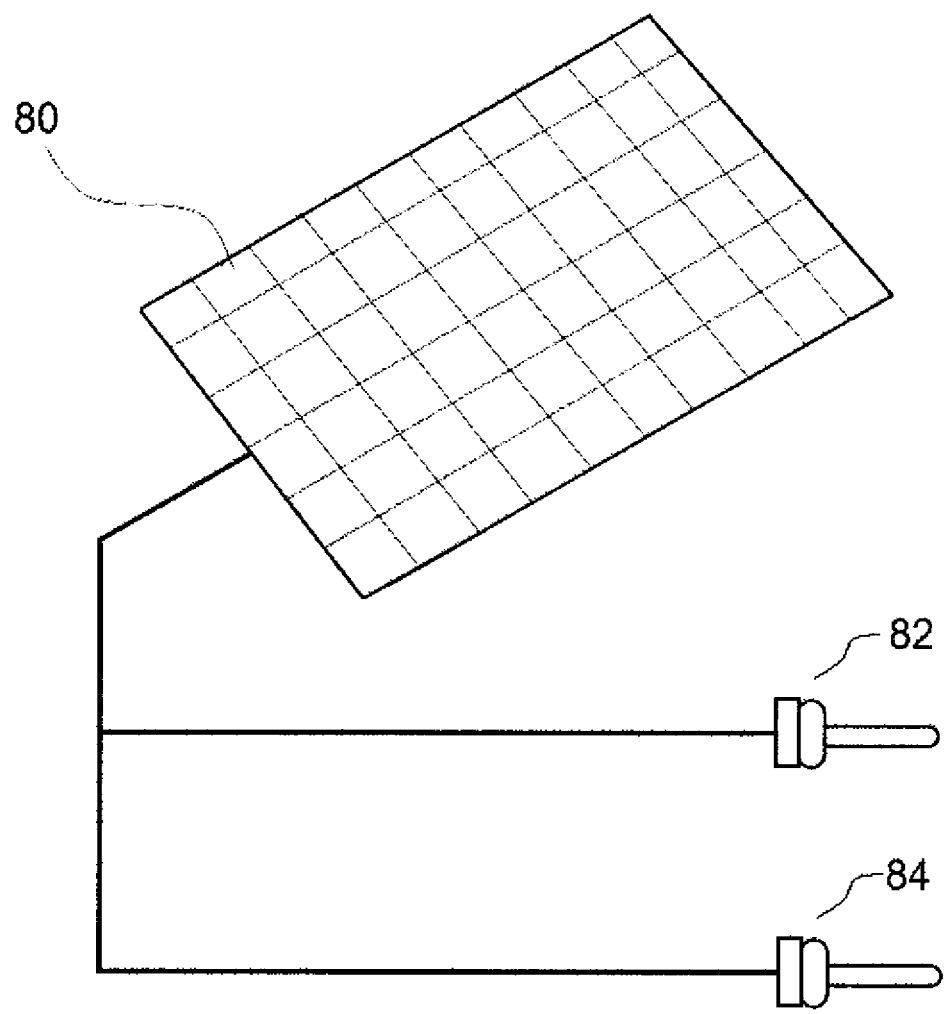
FIG. 8 illustrates another embodiment of a motor oil heating system and method.

FIG. 8 illustrates another embodiment of the current invention with two or more heating elements wherein all heating elements utilize an internal mounting protruding inside a plurality of oil reservoirs to obtain maximum heat transfer to said oil contained within said plurality of oil reservoirs. Here the solar panel 80 provides power to a first heating element 82 and a second heating element 84. More heating elements can be provided in further embodiments. By having two or more heating elements, the invention can be used to heat two or more oil reservoirs on a vehicle at the same time, depending on the respective circuit currents and power source sizes and circuitry. For example, both the motor oil and the transmission oil are heated in the embodiment shown in FIG. 8. Also a heating pad can be used to externally heat the oil pan, while another heating element is used to protrude internally into other oil reservoirs, for example transmission oil reservoir and heat a plurality of vehicle fluids, for example in this embodiment, transmission oil.

Figure 9:
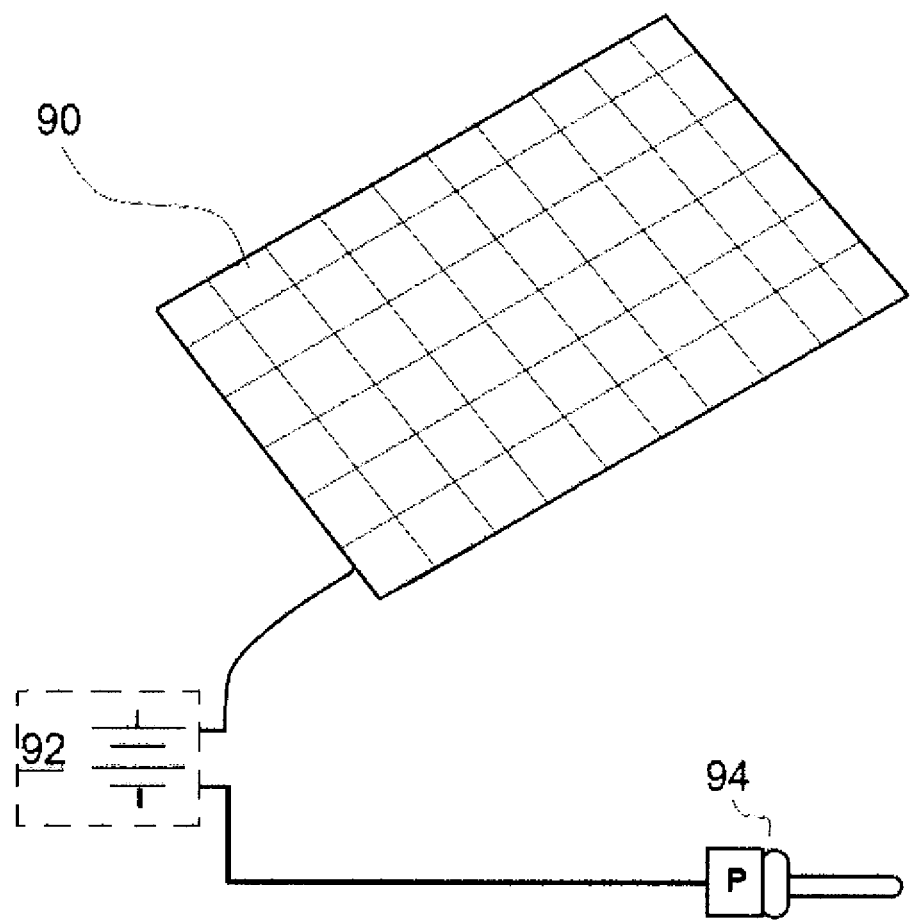
FIG. 9 illustrates an embodiment of a motor oil heating system and method.

FIG. 9 illustrates an embodiment of the current invention with a solar panel 90, a battery 92 and a heating element with a temperature probe 94. In this embodiment the temperature probe is in thermal contact with the oil. When the probe senses the oil is below a predetermined value, it closes the circuit and allows for an electrical current to pass into the heating element for heating the oil. One embodiment of such a internally mounted probe sensor is a thermistor or thermocouple, wherein said electrical device, heating element assembly device transfers heat to a plurality of vehicle fluids and measures the reservoir fluid temperature. One embodiment of the heating element, temperature probe is to measure the temperature and heat the fluid of engine oil. When the oil reaches a predetermined temperature, the probe senses the predetermined temperature and opens, thus shutting off the electrical current to the heating element. Further embodiments of said temperature probe heating element assembly is a method to maximize the fuel efficiency by operating within an optimized temperature delta measured between T1, the temperature above the cold starting temperature of the vehicle fluid, and T2, the temperature below the operating temperature of the vehicle fluid.

The above illustrations provide many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

Best Mode

A motor oil heating system for a vehicle comprising one or more solar panels comprised of one or more photovoltaic cells; one or more heaters thermally coupled to the motor oil, wherein the solar panels are electrically coupled to the heaters and power the heaters based on a voltage generated by the solar panel such that the heaters warm the engine oil.

Mode for Invention

A solar panel comprised of one or more photovoltaic cells is connected to a heating element using electrical wiring such that the solar panel collects energy from light, converts it into electricity and supplies the electricity to a heating element. The heating element is thermally coupled to the motor oil reservoir of an engine such that the motor oil is kept warm when there is sufficient light impacting the photovoltaic cells. This is accomplished by placing the heating element on or near an oil pan of a vehicle, such that when the vehicle is not operating, the oil temperature is maintained above ambient temperature when there is sufficient light to power the heating element.

A single solar cell normally produces voltage and current much less than the typical requirement of a heating element. A photovoltaic cell typically provides 0.2-1.4 V and 0.1-5 A, depending on the photovoltaic cell and its operating conditions, e.g. direct sun light, cloudy, etc., while the electrical load most likely requires a greater operating voltage and current. Thus a number of photovoltaic cells are arranged in series to provide the needed voltage requirement, and arranged in parallel to provide the needed current requirement.

One having skill in the art will recognize that there are many ways to effect the collection of solar power and conversion into electricity. For vehicles, a thin film flexible solar panel may be used to conform to existing vehicle designs so that environmental and operating conditions are not adversely affected.

There are many types of heating elements known in the art. A heating element converts electricity into heat through the process of Joule heating. Electrical current running through the element encounters resistance, resulting in heating of the element. One having skill in the art would recognize that thermally coupling the heating element to the vehicle oil requires selection of an appropriate means so that the oil, which may be flammable, it not overheated. The heating element may be thermally coupled by attaching it to the exterior of the oil pan using a variety of means.

Industrial Applicability

This invention provides increased fuel efficiency by heating the engine oil from a 'cold start' temperature, which is determined by environmental settings, to a temperature where the oil viscosity is reduced such that pumping the oil through the engine is facilitated. The cold start temperature is may be determined by the ambient temperature or the other factors wherein the oil temperature is below its optimum viscosity. One having skill in the art will appreciate that the further from the optimum operating temperature the oil is, the more fuel efficiency can be increased with the current invention. Also one having skill in the arts will appreciate that the current invention may be used for motor oil, for transmission oil or other fluids where increasing their temperature increases overall engine efficiency.

The benefit of the current invention is that the engine oil is warmed using energy from renewable sources. Since it is easier for an engine to pump a warm oil than a cold oil, the engine will have less of a load and consequently consume less power. In effect this invention provides increased fuel economy by reducing gasoline consumption for the same engine performance.

Sequence List Text

N/A

The invention claimed is:

1. A motor heating system for a vehicle comprising:
   one or more solar panels comprised of one or more photovoltaic cells;
   a switch electrically coupled with said one or more solar panels;
   a first heating element electrically coupled with said switch; and
   a second heating element electrically coupled with said switch,
   wherein said first heating element is thermally coupled with a first fluid reservoir and said second heating element is thermally coupled with a second fluid reservoir, and said switch can be operated to selectively power one or more of the heating elements based on a voltage generated by the solar panels such that the heating elements warm the fluid in the selected fluid reservoirs above ambient temperature, and
   wherein one or more of the first and second heating elements is a heating pad.

2. The system of claim 1, wherein the fluid in one or more of the first and second fluid reservoirs is motor oil.

3. The system of claim 1, wherein the fluid in one or more of the first and second fluid reservoirs is transmission oil.

4. A motor heating system for a vehicle comprising:
   one or more solar panels comprised of one or more photovoltaic cells;
   a switch electrically coupled with said one or more solar panels;
   a first heating element electrically coupled with said switch; and
   a second heating element electrically coupled with said switch,
   wherein said first heating element is thermally coupled with a first fluid reservoir and said second heating element is thermally coupled with a second fluid reservoir, and said switch can be operated to selectively power one or more of the heating elements based on a voltage generated by the solar panels such that the heating elements warm the fluid in the selected fluid reservoirs above ambient temperature, and
   wherein one or more of the first and second heating elements is an insert mechanism inserted into the interior of the first or second fluid reservoir.

5. The system of claim 4, wherein the fluid in one or more of the first and second fluid reservoirs is motor oil.

6. The system of claim 4, wherein the fluid in one or more of the first and second fluid reservoirs is transmission oil.

* * * * *